United States Patent [19]
Kim

[11] Patent Number: 6,098,161
[45] Date of Patent: Aug. 1, 2000

[54] METHOD OF GENERATING ADDRESS OF COEFFICIENT MEMORY IN OFDM ADAPTIVE CHANNEL EQUALIZER AND APPARATUS EMPLOYING THE SAME

[75] Inventor: Young-Sang Kim, Seoul, Rep. of Korea

[73] Assignee: Daewoo Electronics Co., Ltd., Seoul, Rep. of Korea

[21] Appl. No.: 09/105,247

[22] Filed: Jun. 26, 1998

[30] Foreign Application Priority Data

Jun. 26, 1997 [KR] Rep. of Korea ..................... 97-27635

[51] Int. Cl.[7] ............................... H03H 7/30; H03H 7/40
[52] U.S. Cl. ........................................ 711/220; 375/232
[58] Field of Search ............................ 375/232; 711/220

[56] References Cited

FOREIGN PATENT DOCUMENTS 09233045  9/1997  Japan .

Primary Examiner—Jack A. Lane
Attorney, Agent, or Firm—Pillsbury Madison & Sutro LLP

[57] ABSTRACT

A method and an apparatus for generating address of a coefficient memory in an OFDM adaptive channel equalizer are disclosed. The address generating apparatus comprises a signal generator for generating a symbol identification signal according to modulo-(Y+1) operation on symbol numbers within one OFDM transmission frame; a first pulse generator for generating a first pulse signal synchronized with a sample clock according to the location of the pilot signal within each symbol respective to the symbol identification signal; a write address generator for generating a write address of the coefficient memory by the first pulse signal and the symbol identification signal; a second pulse generator for generating a second pulse signal by frequency-dividing the sample clock by Y; and a read address generator for generating a read address of the coefficient memory by the second pulse signal. Therefore, the address and the enable signal for the coefficient memory can be simply generated by using the sequential circuit such as the counter, thereby accessing efficiently the updated coefficient value according to the pilot insertion principle.

9 Claims, 5 Drawing Sheets

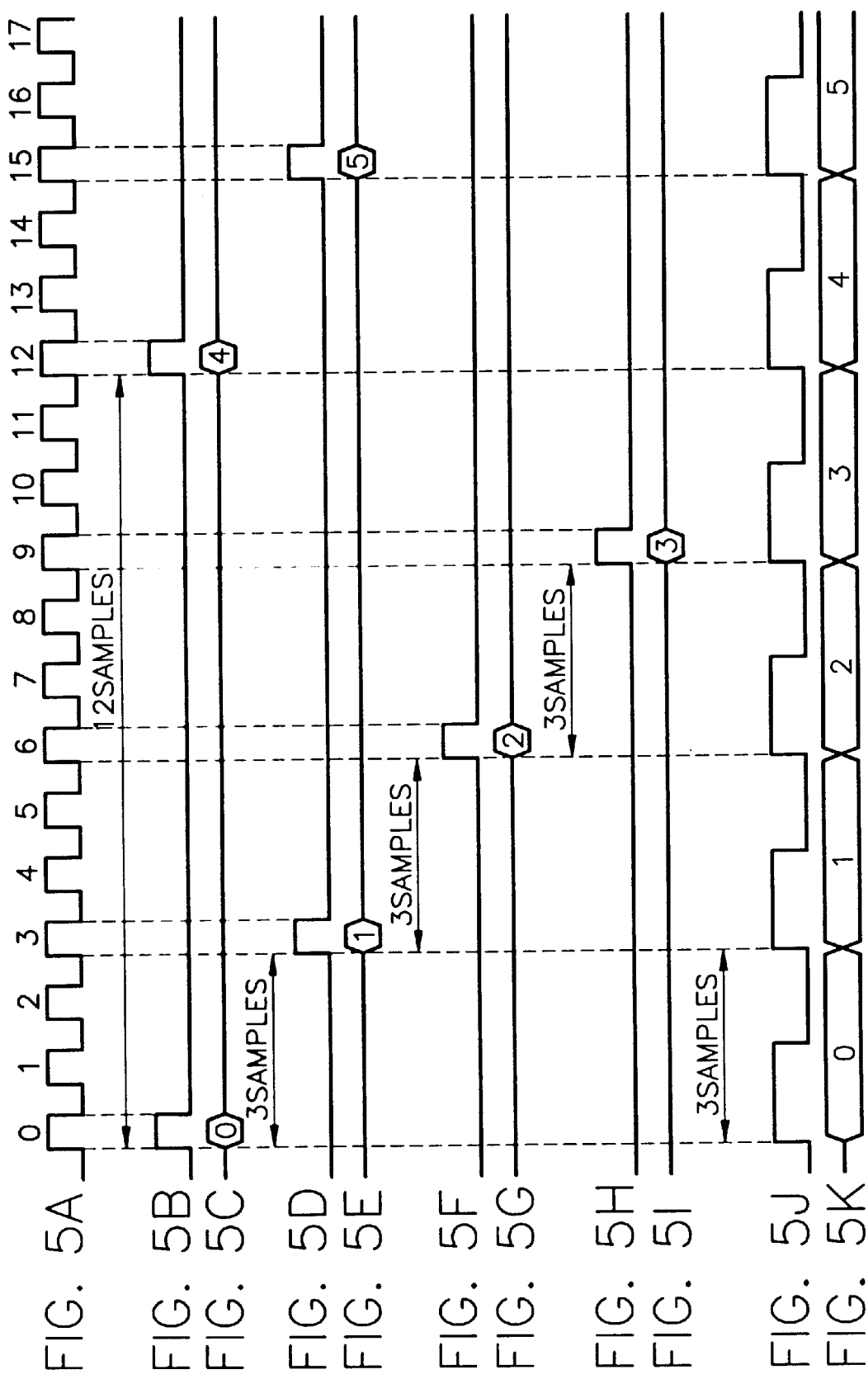

METHOD OF GENERATING ADDRESS OF COEFFICIENT MEMORY IN OFDM ADAPTIVE CHANNEL EQUALIZER AND APPARATUS EMPLOYING THE SAME

BACKGROUND OF THE INVENTION

1. Field of the Invention

The present invention relates to an Orthogonal Frequency Division Multiplexing (OFDM) adaptive channel equalizer, and more particularly to a method of generating address for accessing a coefficient memory and an apparatus employing the same.

2. Description of the Prior Art

In an OFDM method, serially-inputted symbol streams are divided into unit blocks. The symbol streams of each unit block are converted into N number of parallel symbols. After the conversion, these symbols are multiplexed and added by using a plurality of subcarriers having different frequencies, respectively, according to Inverse Fast Fourier Transform (IFFT) algorithm and transmitted via the channel. That is, the N number of parallel symbols are defined as one unit block, and each subcarrier of the unit block has an orthogonal characteristic, which does not have an influence on subchannels. Consequently, in the OFDM method, the Inter-Symbol Interference (ISI) caused by the multi-path fading can be reduced by increasing symbol period in proportion to the number of subchannels (N) while maintaining the same symbol transmission rate as that of a single carrier transmission method. Especially, a guard interval is inserted between the transmitted symbols to enhance the capability of the ISI reduction. As a result, a channel equalizer of simplified structure can be implemented.

The ISI caused by the multi-path fading can be removed with ease by using the guard interval inserted between the transmitted symbols, however, it is not easy to remove the intra-symbol interference, that is, the inter-sample interference, in the OFDM method. Hence, in an OFDM receiver, the channel equalizer for removing the intra-symbol interference is further required. This channel equalizer should detect and remove the distortion generated according to varying channel environment since each sample within a symbol has different subcarriers.

In the OFDM receiver, a Pilot Symbol Insertion (PSI) method can be proposed as an efficient channel equalization method. In the PSI method, a pilot signal is transmitted periodically from an OFDM transmitter and thus time interval for transmitting the pilot signal can be detected in the OFDM receiver. By the way, the transmitted pilot signal is decoded to estimate the distortion caused by the channel environment, in the OFDM receiver. The distortion in symbols belonging to an useful data area can be compensated using the estimated value.

In the PSI method, the pilot signal is periodically inserted in some samples (subchannels) of each symbol. A transfer function of one channel is obtained by using the pilot signal, and transfer functions of another channels are estimated by using an interpolation technique. However, for the OFDM signal, the channel estimation method implemented by the interpolation technique is not capable of adapting to abrupt changes in the channel environment.

SUMMARY OF THE INVENTION

In view of the foregoing, it is an object of the present invention to provide a method of generating address for accessing a coefficient memory in an OFDM adaptive channel equalizer for equalizing the received OFDM signal on updating the filtering coefficients by the pilot signal.

It is another object of the present invention to provide an apparatus for generating address for accessing a coefficient memory in an OFDM adaptive channel equalizer.

In order to achieve the first object, the present invention provides the method of generating address of a coefficient memory for storing filtering coefficients of an OFDM signal having an OFDM transmission frame structure in which a pilot signal is carried by each X-th sample within one symbol of the OFDM transmission frame and the location of the pilot signal between adjacent symbols differs by Y samples, in an OFDM adaptive channel equalizer for equalizing the OFDM signal on updating the filtering coefficients in unit of group including Y samples based on the pilot signal along the frequency axis in the OFDM transmission frame, comprising the steps of: a) generating a symbol identification signal according to modulo-(Y+1) operation on symbol numbers within the OFDM transmission frame; b) detecting the location of the pilot signal within each symbol respective to the symbol identification signal of the step a); c) generating a first pulse signal synchronized with a sample clock according to the detection result of the step b); d) generating a write address of the coefficient memory using the counting bits obtained by counting the first pulse signal of the step c) and the bits of the symbol identification signal; e) generating a second pulse signal by dividing frequency of the sample clock by Y; and f) generating a read address of the coefficient memory by counting the second pulse signal of the step d).

In order to achieve the second object, the present invention provides the apparatus for generating addresses of a coefficient memory for storing filtering coefficients of an OFDM signal having an OFDM transmission frame structure in which a pilot signal is carried by each X-th sample within one symbol of the OFDM transmission frame and the location of the pilot signal between adjacent symbols differs by Y samples, in an OFDM adaptive channel equalizer for equalizing the OFDM signal by updating the filtering coefficients in unit of group including Y samples based on the pilot signal along the frequency axis in the OFDM transmission frame, comprising: means for generating a symbol identification signal according to modulo-(Y+1) operation on symbol numbers within one OFDM transmission frame; a first pulse generator for generating a first pulse signal synchronized with a sample clock according to the location of the pilot signal within each symbol respective to the symbol identification signal; a write address generator for generating a write address of the coefficient memory by the first pulse signal from the first pulse generator; a second pulse generator for generating a second pulse signal by dividing frequency of the sample clock by Y; and a read address generator for generating a read address of the coefficient memory by the second pulse signal from the second pulse generator.

BRIEF DESCRIPTION OF THE DRAWINGS

The above and other objects, features, and advantages of the present invention will be apparent from the following detailed description of the preferred embodiments of the invention in conjunction with the accompanying drawings, in which:

FIGS. 5A to 5K are a timing diagram of the respective signals in FIG. 4.

DETAILED DESCRIPTION OF THE PREFERRED EMBODIMENT

Figure 1:
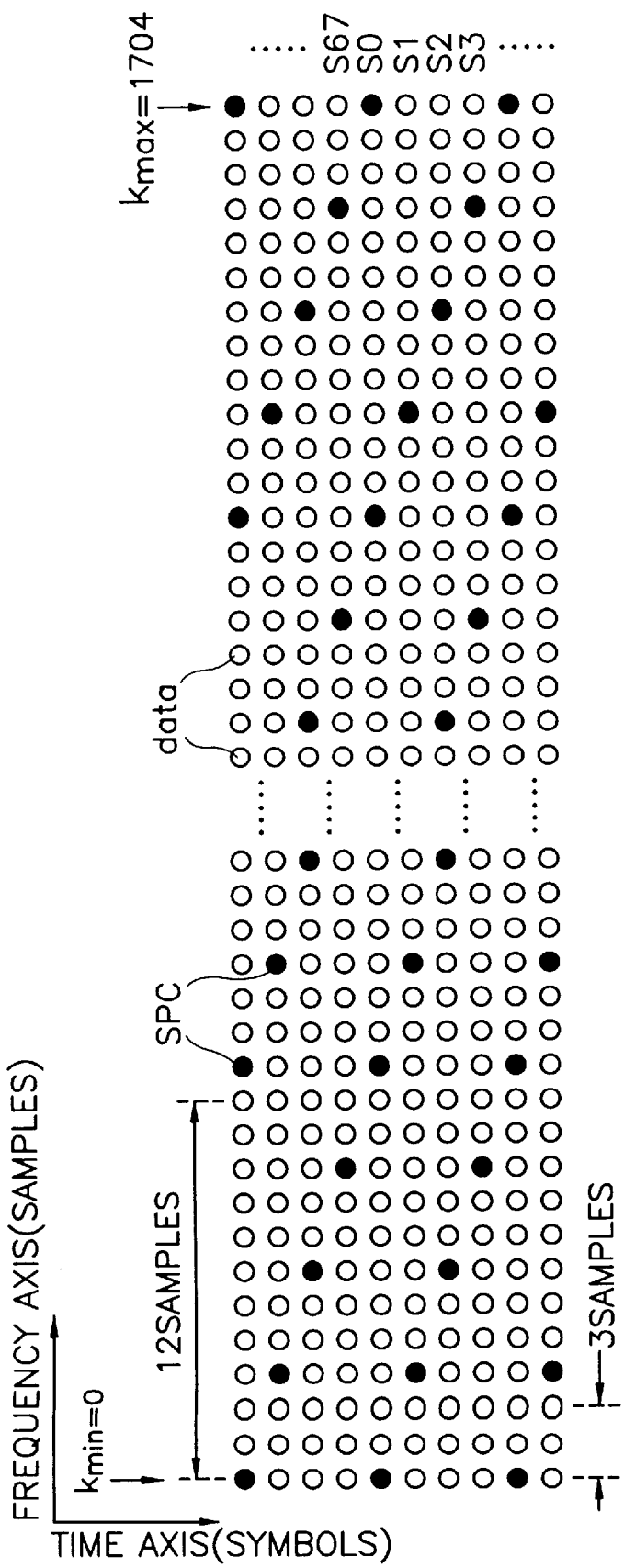
FIG. 1 is a structural diagram of an OFDM transmission frame according to an embodiment of the present invention.

Referring to the drawings attached to this specification, detailed description of the preferred embodiment will be given. Whenever possible, the same reference numbers will be used throughout the drawings to refer to the same or like parts.

First, referring to the pilot cells used as a reference signal for channel equalization, the pilot cells comprise a scattered pilot cell (SPC), a continual pilot carrier (CPC), and a transmission parameter signaling (TPS) pilot. The pilot cells are used in frame synchronization, frequency synchronization, time synchronization, channel estimation, and transmission mode identification. And they are also used to detect a phase noise. Those pilot cells together with the transmitted signals construct an OFDM frame, and a reference information transmitted to the receiver is known in advance in this case. Cells having the reference information value, are transmitted as about 1.4 times of power level of a transmission data, that is, "boosted" power level. In an embodiment of the present invention, the SPC is defined as a reference signal among above pilot cells. The OFDM transmission frame having the SPC used as the reference signal is represented as FIG. 1.

In FIG. 1, $k_{min}=0$ through $k_{max}=1704$ represent 1705 number of carriers for 2K Fast Fourier Transform (FFT) mode, and S0 through S67 represent 68 number of symbols constructing one OFDM frame. The "data" represents the useful data carrying an information, and the "SPC" represents a scattered pilot cell. The SPC within each symbol repeated in every 12 samples, and the SPCs in adjacent symbols differ by 3 samples. That is, the SPC is distributed at the $k_{min}=0$ and $k_{max}=1704$ of symbols, S64, S0, S4 and etc., having "0" as a result of the modulo-4 operation on the symbol numbers. The adaptive equalization method employing above OFDM transmission frame according to the present invention is represented as FIG. 2.

Figure 2:
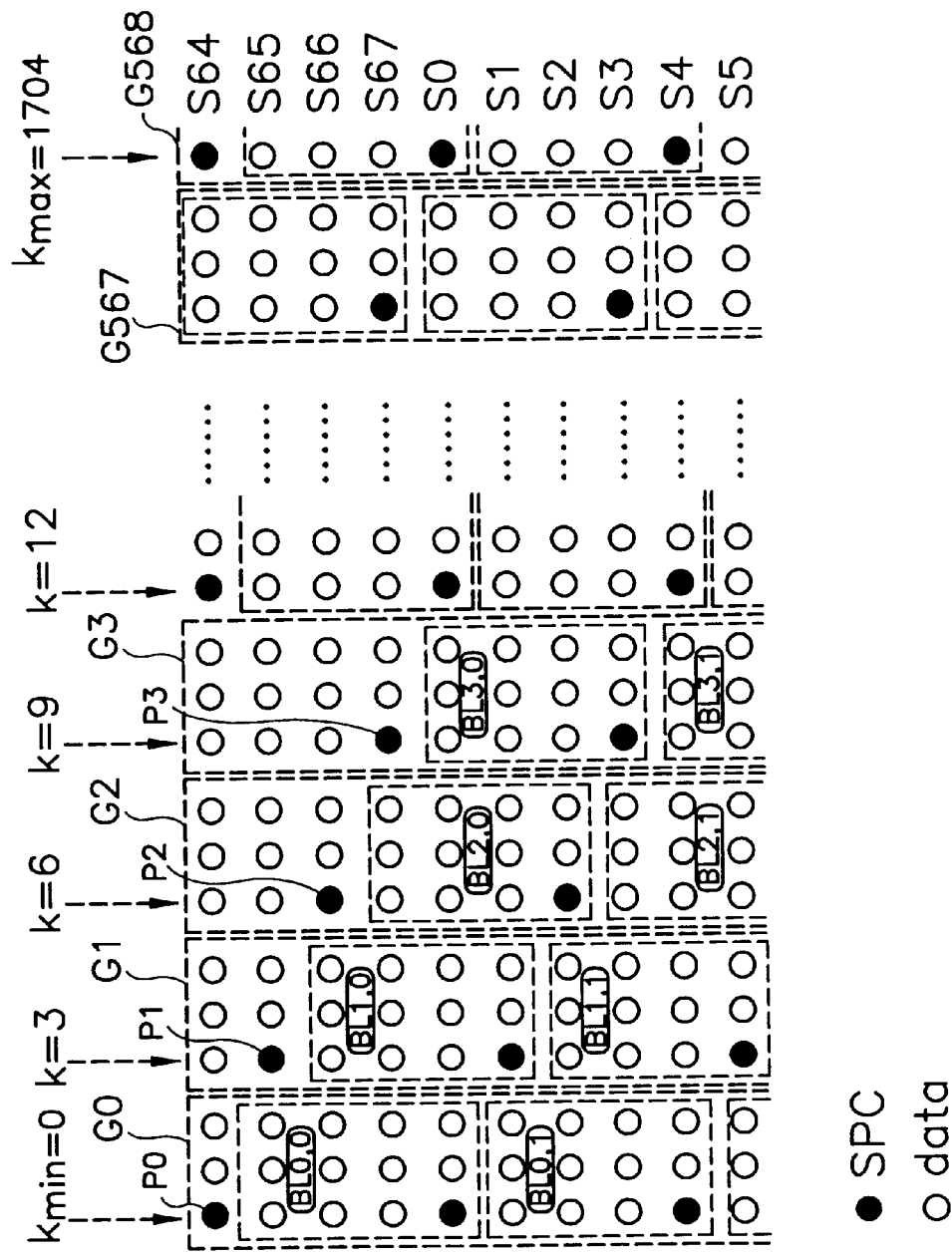
FIG. 2 is a conceptual diagram for describing a channel equalization method using the transmission frame of FIG. 1.

Referring to FIG. 2, every three (3) samples are grouped as Gi (for i=0~568) along the frequency axis. Within a group, block BLi,j comprised with 12 samples centering around one pilot cell is formed, where BLi,j represents the j-th block of the i-th group.

For example, samples carrying by subcarriers k=0 to k=2, k=3 to k=5, k=6 to k=8 and k=9 to k=11 form groups G0, G1, G2 and G3, respectively. In addition, the block BL0,0 including the first SPC (k=0) in symbol S0, the block BL1,0 including the first SPC (k=3) in symbol S1, the block BL2,0 including the first SPC (k=6) in symbol S2, and block BL3,0 including the first SPC (k=9) in symbol S3 are represented as the first block formed in the groups G0, G1, G2 and G3, respectively.

By repeating the following process, the channel equalization is performed while updating the new coefficient value to be applied to next block by using the pilot cell of a current block with respect to each group constructed as above.

First, assuming that the reverse-function of the channel transfer function of block BLi,j is Wi,j, the first reverse-function W0,0 of group G0 is obtained by using the first sample (k=0) P0 in symbol S64. The first reverse-function W1,0 of group G1 is obtained by using the fourth sample (k=3) P1 in symbol S65. That is, the first reverse-functions of groups G0 to G3 are obtained during the transmission period of 4 symbols, S64 to S67. At this time, symbols, S64 to S67 inputted when the first reverse-function is obtained are transmitted without equalizing process.

Second, by using the first reverse-function of each group, the channel equalization of a current block is performed. That is, 12 samples within the block BL0,0 of the group G0 are equalized by the first reverse-function W0,0, and 12 samples within the block BL1,0 of the group Gi are equalized by the first reverse-function W1,0.

Third, the equalized pilot cell of the current block is compared with the original pilot cell of the current block, and the error is calculated according to the result of comparison. The calculated error is used for updating the coefficient value of the reverse-function for the next block. For example, the pilot cell, that is, the first sample (k=0) of symbol S0 of the current block BL0,0 is used for updating the coefficient value of the reverse-function W0,1 for the next block BL0,1 within group G0.

Consequently, within the symbol SO, the reverse-functions W0,0, W1,O, W2,0 and W3,0 are applied to samples carried by subcarriers k=0 to k=2, k=3 to k=5, k=6 to k=8 and k=9 to k11, respectively. Therefore, different reverse-functions are applied to each sample of one symbol, thereby the intra-symbol interference can be removed with ease. An embodiment of the adaptive channel equalizer employing above channel equalization method is represented as FIG. 3.

Figure 3:
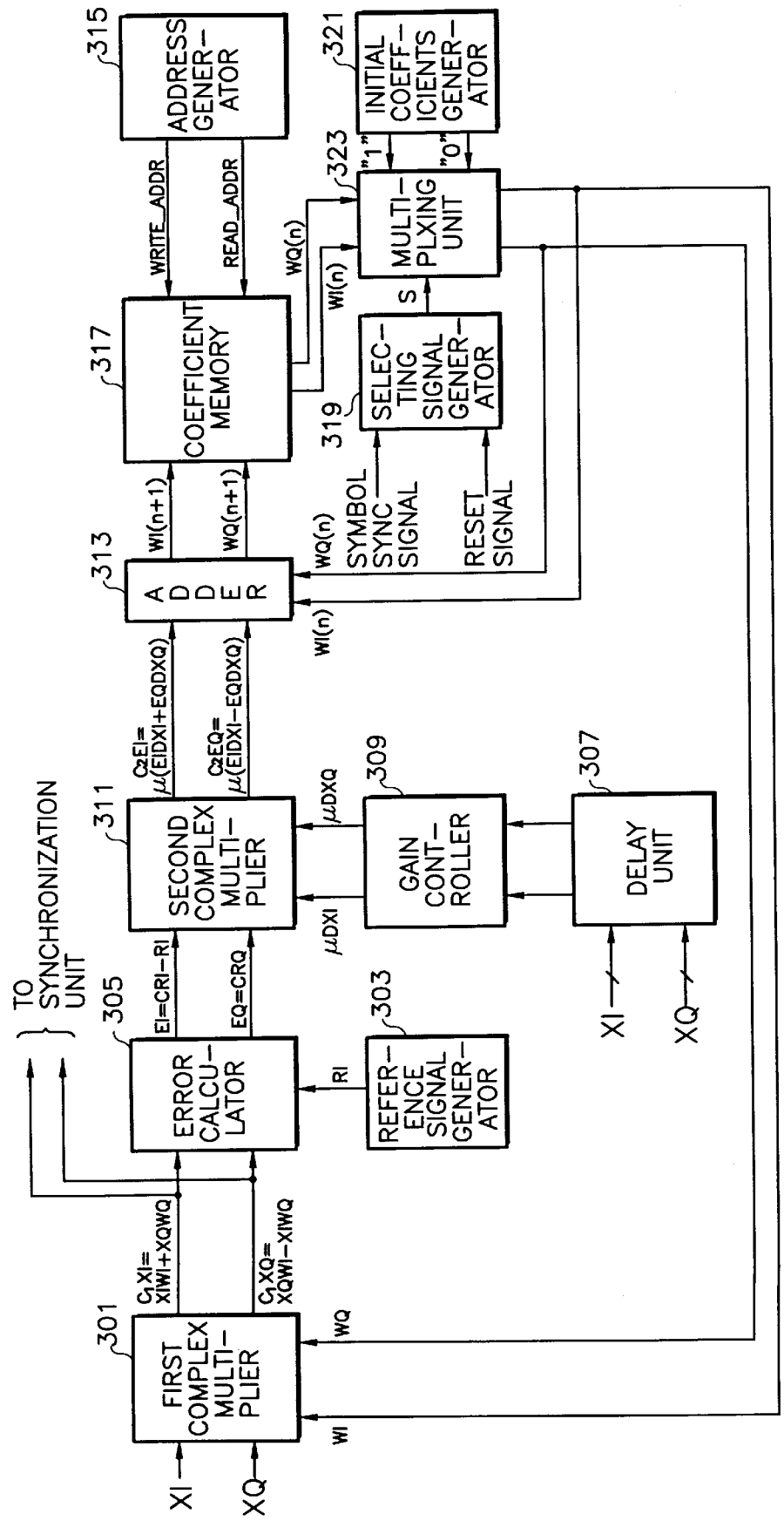
FIG. 3 is a block diagram illustrating an OFDM adaptive channel equalizer employing the method of FIG. 2.

In FIG. 3, the adaptive channel equalizer comprises a first complex multiplier 301, a reference signal generator 303, an error calculator 305, a delay unit 307, a gain controller 309, a second complex multiplier 311, an adder 313, an address generator 315, a coefficient memory 317, a selecting signal generator 319, an initial coefficients generator 321, and a multiplexing unit 323. In the embodiment, the adaptive channel equalizer employs the least mean square algorithm.

Referring to FIG. 3, the first complex multiplier 301 receives an in-phase channel signal XI, a quadrature phase channel signal XQ. And it also receives in-phase and quadrature phase filtering coefficients WI and WQ to perform a complex multiplication, and outputs a first in-phase complex multiplication signal ($C_1XI=XIWI+XQWQ$) and a first quadrature complex multiplication signal ($C_1XQ=XQWI-XIWQ$). The signals outputted from the first complex multiplier 301 are inputted into a synchronization unit (not shown) and the error calculator 305.

The reference signal generator 303 generates a reference signal RI, which corresponds to the pilot signal, and outputs the reference signal RI to the error calculator 305. In accordance with the embodiment of the present invention, the scattered pilot cell (SPC) signal is used as the reference signal.

The error calculator 305 receives the first in-phase and quadrature complex multiplication signals $C_1XI=XIWI+XQWQ$ and $C_1XQ=XQWI-XIWQ$ obtained in the first complex multiplier 301. And it also receives the reference signal RI from the reference signal generator 303 to calculate an error, and outputs an in-phase error signal EI=CRI−RI and a quadrature phase error signal EQ=CRQ. Here, the pilot signal used for the reference signal is obtained from the signal modulated by a binary phase shift keying (BPSK) method at the transmitter, and it has the value of "±1 (real number)" and "0 (imaginary number)". Namely, the error signal EI of the in-phase is resulted by subtracting the reference signal RI outputted from the reference signal generator 303 from the reference signal CRI passing through channel. Meanwhile, the error signal EQ of the quadrature phase is equivalent to CRQ since EQ is obtained by subtracting an imaginary value, which is "0", of the reference signal RI from CRQ.

The delay unit 307 delays the in-phase and quadrature channel signals XI and XQ, and outputs an in-phase delay signal DXI and a quadrature phase delay signal DXQ.

The gain controller 309 receives the in-phase and quadrature phase delay signals DXI and DXQ, and outputs an in-phase gain control signal $\mu$DXI and a quadrature phase gain control signal $\mu$DXQ. A convergence constant $\mu$ of the equalizer corresponding to the gain is required for stable convergence of the equalizer. In general, when the convergence constant $\mu$ is large, the equalizer converges fast, but runs into the risk of divergence. On the contrary, when the convergence constant $\mu$ is small, the equalizer converges slow. Accordingly, it is important to select an appropriate convergence constant $\mu$. In accordance with the embodiment of the present invention, the convergence constant $\mu$ having an approximate value of $2^n$ is selected, enabling to construct a simple hardware.

The second complex multiplier 311 receives the in-phase and quadrature phase error signals EI=CRI−RI and EQ=CRQ and the in-phase and quadrature phase gain control signals $\mu$DXI and $\mu$DXQ, performs the complex multiplication, and outputs a second in-phase complex multiplication signal $C_2EI=\mu[EI\cdot DXI+EQ\cdot DXQ]$ and a second quadrature phase complex multiplication signal $C_2EQ=\mu[EQ\cdot DXI-EI\cdot DXQ]$.

The adder 313 receives the second in-phase and quadrature phase complex multiplication signals $C_2EI=\mu[EI\cdot DXI+EQ\cdot DXQ]$ and $C_2EQ=\mu[EQ\cdot DXI-EI\cdot DXQ]$ from the second complex multiplier 311, and the in-phase and quadrature phase filtering coefficients WI(n) and WQ(n) from the multiplexing unit 323, adds them, and outputs an updated in-phase filtering coefficient $WI(n+1)=WI(n)+C_2EI=WI(n)+\mu[EI\cdot DXI+EQ\cdot DXQ]$ and an updated quadrature phase filtering coefficient $WQ(n+1)=WQ(n)+C_2EQ=WQ(n)+\mu[EQ\cdot DXI-EI\cdot DXQ]$.

The address generator 315 generates and outputs a write address signal WRITE_ADDR and a read address signal READ_ADDR.

The coefficient memory 317 stores the updated filtering coefficients WI(n+1) and WQ(n+1) according to the write address signal WRITE_ADDR, and outputs the updated filtering coefficients WI(n+1) and WQ(n+1) according to the read address signal READ_ADDR.

The selecting signal generator 319 generates a selecting signal according to a symbol sync signal SYMBOL_SYNC. Since there is no coefficient when the equalizer is operated at the initialization stage, the selecting signal shall be "low (0)" in order to select the initial coefficients ("1" and "0") until the first 4 symbols are passed through. However, the selecting signal shall be "high (1)" for selecting the updated filtering coefficients when all the first 4 symbols are passed through.

The initial coefficients generator 321 generates the initial coefficients "1" for the real number and "0" for the imaginary number.

The multiplexing unit 323 selects one of the initial coefficients ("1" and "0") from the initial coefficients generator 321 and the updated filtering coefficients from the coefficient memory 317, according to the selecting signal from the selecting signal generator 319, and feeds back the selected coefficients to the first complex multiplier 301 and the adder 313.

Figure 4:
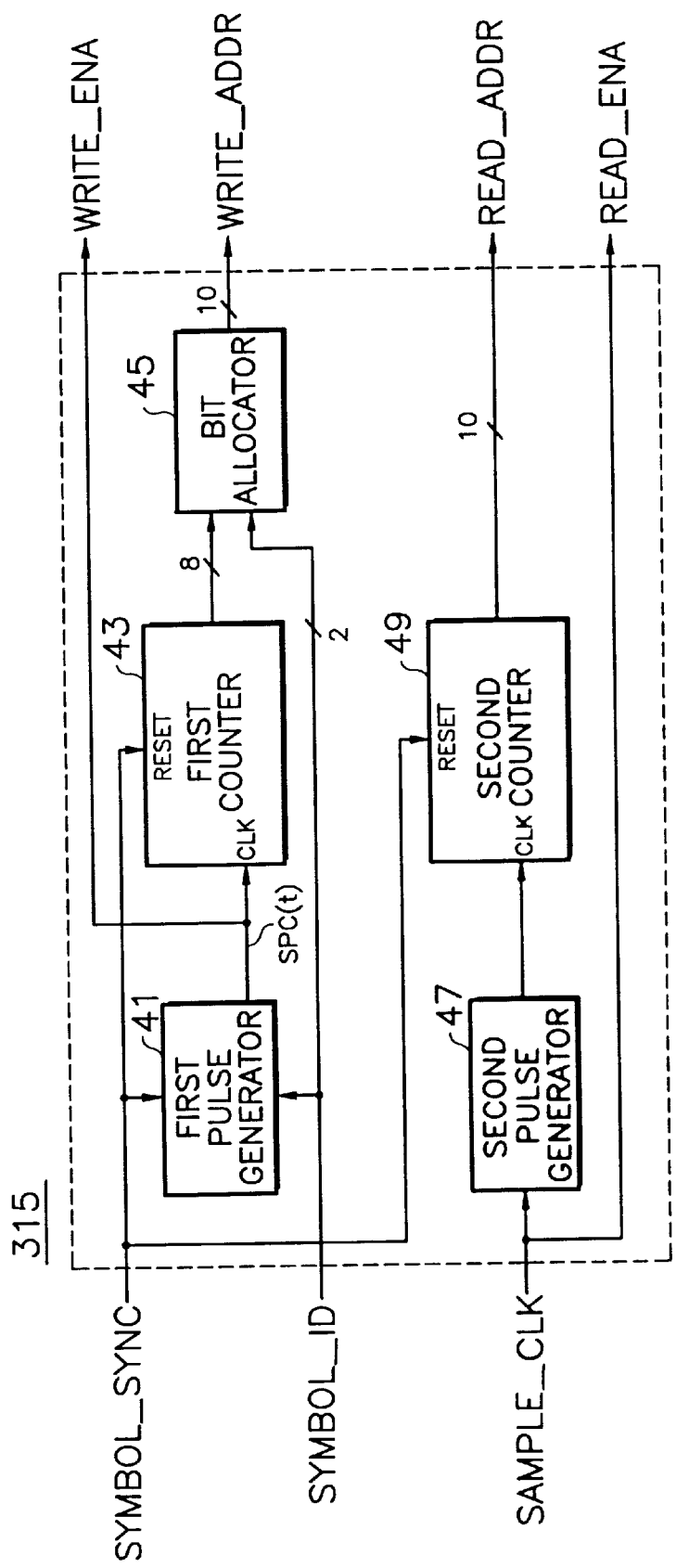
FIG. 4 is a block diagram illustrating an address generating apparatus in a coefficient memory of FIG. 3 according to the present invention.

Meanwhile, the address generator 315 in FIG. 3 according to the present invention is represented as FIG. 4.

Referring to FIG. 4, the address generator 315 comprises a first pulse generator 41 for generating a first pulse SPC(t) of each symbol by detecting the location of the SPC inserted within a symbol from a symbol identification signal, SYMBOL_ID, a first counter 43 for receiving the first pulse SPC(t) from the first pulse generator 41 as a clock signal and counting the clock signal to output a write address, WRITE_ADDR after resetting by a symbol sync signal, SYMBOL_SYNC, a bit allocator 45 for allocating the counting bits of the first counter 43 to the upper bits of the write address and the bits of the symbol identification signal to the lower bits thereof, a second pulse generator 47 for generating a second pulse in every 3 samples by frequency-dividing a sample clock SAMPLE_CLK, and a second counter 49 for receiving the second pulse from the second pulse generator 47 as a clock signal and counting the clock signal to output a read address READ_ADDR after resetting by the symbol sync signal, SYMBOL_SYNC.

FIGS. 5A to 5K are a timing diagram of the respective signals in FIG. 4. FIG. 5A represents a sample clock. FIG. 5B represents the first pulse SPC(0) generated at symbol identification signal, SYMBOL_ID '$00_2$', and FIG. 5C represents the write address, WRITE_ADDR for coefficient values of symbol having the pulse as shown in FIG. 5B. FIG. 5D represents the first pulse SPC(1) generated at symbol identification signal, SYMBOL_ID '$01_2$', and FIG. 5E represents the write address, WRITE_ADDR for coefficient value of symbol having the first pulse as shown in FIG. 5D. FIG. 5F represents the pulse SPC(2) generated at symbol identification signal, SYMBOL_ID '$10_2$', and FIG. 5G represents the write address WRITE_ADDR for coefficient value of symbol having the pulse as shown in FIG. 5F. FIG. 5H represents the first pulse SPC(3) generated at symbol identification signal, SYMBOL_ID '$11_2$', and FIG. 5I represents the write address, WRITE_ADDR for coefficient value of symbol having the pulse as shown in FIG. 5H. FIG. 5J represents the pulse generated by frequency-dividing the sample clock (FIG. 5A) by 3, and FIG. 5K represents the read address READ_ADDR for coefficient values of each symbol generated by counting the pulse of FIG. 5J.

Referring to FIGS. 1 to 5, an operation of the address generator according to the present invention will be described in detail.

In the channel equalizer according to the present invention, the coefficient values are updated on the basis of the SPC signal. Accordingly, the write and read address of the coefficient memory (317 in FIG. 4) for storing the coefficient values are generated on the basis of the SPC signal.

OFDM transmission frame of FIG. 1, the locations of the SPC signals can be known by the modulo-4 operation. The symbol identification signal SYMBOL_ID for identifying the symbols according to the principle of pilot insertion within a symbol and the locations k of the SPC signal (address k) within a symbol can be represented as the following table 1.

TABLE 1

| symbol identification signal (SYMBOL_ID) | address of the SPC signal (k) | the number of the SPC signal |
|---|---|---|
| $00_2$ | 0, 4, 8, 12, 16, . . . , 564, 568 | 143 |
| $01_2$ | 1, 5, 9, 13, 17, . . . , 565 | 142 |
| $10_2$ | 2, 6, 10, 14, 18, . . . , 566 | 142 |
| $11_2$ | 3, 7, 11, 15, 19, . . . , 567 | 142 |

In table 1, the symbol identification signal, SYMBOL_ID, is represented as the binary number and the address of the SPC signal are represented as the carrier index k. Referring to FIG. 1, S0, S4, S8, . . . , and S64 correspond to the symbols having the symbol identification signal, SYMBOL_ID $00_2$. S1, S5, S9, . . . , and S65 correspond to the symbols having the symbol identification signal, SYMBOL_ID $01_2$. S2, S6, S10, . . . , and S66 correspond to the symbols having the symbol identification signal, SYMBOL_ID $10_2$. And S3, S7, S11, . . . , and S67 correspond to the symbols having the symbol identification signal, SYMBOL_ID $11_2$.

The capacity of the coefficient memory (317 in FIG. 4) is determined according to the number of groups, that is the number of the pilot signal, since the coefficient values are updated by the pilot signal within a block with respect to each group. When the pilot signal is set as the above table 1, the coefficient memory (317 in FIG. 4) stores 569 number of coefficient values. When the address of the coefficient memory 317 ranges from 0 to 568, the address for storing the coefficient values has the same value as the group number.

The generation of the write address WRITE_ADDR and the write enable signal WRITE_ENA used for the write operation of the coefficient memory (317 of FIG. 4) will be described as follows.

The first pulse SPC(t) outputted from the first pulse generator 41 corresponds to one of the pulses in FIGS. 5B, 5D, 5F and 5H. According to the symbol identification signal SYMBOL_ID of each symbol, the first pulse SPC(t) becomes 'high' logic level pulse at the sample clock when the pilot signal is inputted. Consequently, the first pulse SPC(t) has 'high' logic level in every 12 samples, and is generated 3 samples behind with respect to the first pulse SPC(t−1) of the previous symbol.

The first counter 43 comprises 8 bits counter for counting from 0 to 143. It is reset by the symbol sync signal, SYMBOL_SYNC, and counts the first pulse SPC(t) received as a clock signal. The bit allocator 45 allocates 8 bits of the counted value in the first counter 43 to the upper bits of the write address WRITE_ADDR, and 2 bits of the symbol identification signal SYMBOL_ID to the lower bits thereof.

When the bits of the write address WRITE_ADDR is represented as the bits of the counting value and the bits of the symbol identification signal SYMBOL_ID, the write address WRITE_ADDR generated according to the symbol is as follows.

The write address WRITE_ADDR of the coefficient value for the symbol whose symbol identification signal SYMBOL_ID is '$00_2$', is generated as the sequence of 0×00+00 (=0), 0×01+00 (=4), 0×10+00 (=8), . . . , 10001111+00 (=568) in order when the first pulse SPC(0) becomes the active high state, as shown in FIG. 5C. The write address WRITE_ADDR of the coefficient value for the symbol whose symbol identification signal SYMBOL_ID is '$01_2$', is generated as the sequence of 0×00+01 (=1), 0×01+01 (=5), 0×10+01 (=9), . . . ,10001110+01 (=565) in order when the first pulse SPC(1) becomes the active high state, as shown in FIG. 5E. The write address WRITE_ADDR of the coefficient value for the symbol whose symbol identification signal SYMBOL_ID is '$10_2$', is generated as the sequence of 0×00+10 (=2), 0×01+10 (=6), 0×01+10 (=10), . . . ,10001111+10 (=566) in order when the first pulse SPC(2) becomes the active high state, as shown in FIG. 5G. The write address WRITE_ADDR of the coefficient value for the symbol whose symbol identification signal SYMBOL_ID is '$11_2$', is generated as the sequence of 0×00+11 (=3), 0×01+11 (=7), 0×10+11 (=11), . . . , 10001111+11 (=567) in order when the first pulse SPC(3) becomes the active high state, as shown in FIG. 5I.

Also, the first pulse SPC(t) from the first pulse generator 41 is used as the write enable signal WRITE_ENA, so that the write operation can be performed at the active high state of the first pulse SPC(t).

By the way, the read address READ_ADDR and the read enable signal READ_ENA used for the read operation of the coefficient memory (317 in FIG. 4) are generated as follows.

The second pulse generator 47 receives the sample clock SAMPLE_CLK, divides its frequency by 3 and generates a second pulse as shown in FIG. 5J. The second counter 49 counts the second pulse and generates the read address READ_ADDR as shown in FIG. 5K. At this time, each symbol has the read address READ_ADDR increased by 1 at the interval of 3 samples.

Also, the sample clock SAMPLE_CLK is used as the read enable signal READ_ENA, so that the read operation can be performed at the active high state of the sample clock SAMPLE_CLK. As above, the coefficient value read consecutively for the period of 3 samples is inputted to the adder (313 in FIG. 3) to calculate the updated coefficients. It is also inputted to the first complex multiplier (301 in FIG. 3) and applied to the received data XI and XQ.

In other words, referring to FIG. 2, the coefficient value of the channel reverse-function for group G0 is stored in the write address '0' of the coefficient memory (317 in FIG. 3), and the coefficient value of the channel reverse-function for group G1 is stored in the write address '1'. Similarly, the coefficient value of the channel reverse-function for group G567 is stored in the write address '567'. In addition, all the samples in each block are equalized referring to the updated coefficient stored in the coefficient memory with respect to the group to which the respective block belongs. The coefficient value is updated by the pilot signal respective to each block within a group and is stored in the coefficient memory.

As described above, according to the present invention, the address and the enable signal for the coefficient memory can be simply generated by using the sequential circuit such as the counter, thereby accessing efficiently the updated coefficient value according to the pilot insertion principle.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A method of generating address of a coefficient memory for storing filtering coefficients of an OFDM signal having an OFDM transmission frame structure in which a pilot signal is carried by each X-th sample within one symbol of the OFDM transmission frame and the location of the pilot signal between adjacent symbols differs by Y samples, in an OFDM adaptive channel equalizer for equalizing the OFDM signal on updating the filtering coefficients in unit of group including Y samples based on the pilot signal along the frequency axis in the OFDM transmission frame, comprising the steps of:

a) generating a symbol identification signal according to modulo-(Y+1) operation on symbol numbers within the OFDM transmission frame;

b) detecting the location of the pilot signal within each symbol respective to the symbol identification signal of said step a);

c) generating a first pulse signal synchronized with a sample clock according to the detection result of said step b);

d) generating a write address of the coefficient memory using counting bits obtained by counting the first pulse signal of said step c) and the bits of the symbol identification signal;

e) generating a second pulse signal by frequency-dividing the sample clock by Y; and f) generating a read address of the coefficient memory by counting the second pulse signal of said step e).

2. The method of claim 1, wherein said step d) comprises;

d1) allocating the counting bits to the upper bits of the write address; and d2) allocating the bits of the symbol identification signal to the lower bits of the write address.

3. The method of claim 1, wherein the pilot signal is a scattered pilot cell.

4. An apparatus for generating address of a coefficient memory for storing filtering coefficients of an OFDM signal having an OFDM transmission frame structure in which a pilot signal is carried by each X-th sample within one symbol of the OFDM transmission frame and the location of the pilot signal between adjacent symbols differs by Y samples, in an OFDM adaptive channel equalizer for equalizing the OFDM signal on updating the filtering coefficients in unit of group including Y samples based on the pilot signal along the frequency axis in the OFDM transmission frame, comprising:

means for generating a symbol identification signal according to modulo-(Y+1) operation on symbol numbers within the OFDM transmission frame;

a first pulse generator for generating a first pulse signal synchronized with a sample clock according to the location of the pilot signal within each symbol respective to the symbol identification signal;

a write address generator for generating a write address of the coefficient memory by the first pulse signal from said first pulse generator and the symbol identification signal;

a second pulse generator for generating a second pulse signal by dividing the frequency of the sample clock by Y; and a read address generator for generating a read address of the coefficient memory by the second pulse signal from said second pulse generator.

5. The apparatus of claim 4, wherein said write address generator comprises;

a counter for counting the first pulse signal after resetting by a symbol sync signal; and a bit allocator for allocating the counting bits of said counter to the upper bits of the write address and the bits of the symbol identification signal to the lower bits thereof.

6. The apparatus of claim 4, wherein said read address generator is implemented by a counter for counting the second pulse signal after resetting by a symbol sync signal.

7. The apparatus of claim 4, wherein the first pulse signal is applied to the coefficient memory as a write enable signal.

8. The apparatus of claim 4, wherein the sample clock is applied to the coefficient memory as a read enable signal.

9. The apparatus of claim 4, wherein the pilot signal is a scattered pilot cell.

* * * * *